United States Patent

Frager

[11] Patent Number: 5,531,114
[45] Date of Patent: Jul. 2, 1996

[54] RAIN GAUGE

[76] Inventor: James R. Frager, 702 N. C St., Fairfield, Nebr. 68938

[21] Appl. No.: 408,733

[22] Filed: Mar. 22, 1995

[51] Int. Cl.⁶ ......................................... G01W 1/00
[52] U.S. Cl. ........................ 73/170.17; 73/170.21
[58] Field of Search ............... 73/170.07, 170.17, 73/170.21, 170.23, 170.11

[56] References Cited

U.S. PATENT DOCUMENTS

| | | | |
|---|---|---|---|
| 916,060 | 3/1909 | Thomson | 73/170.17 |
| 2,384,954 | 9/1945 | Moore | 73/170.17 |
| 2,570,710 | 10/1951 | Quinteros | 73/170.17 |
| 2,935,872 | 5/1960 | Misner | 73/170.07 |
| 3,826,135 | 7/1974 | Hollmann | 73/170.07 |
| 4,665,744 | 5/1987 | Smith | 73/170.17 |
| 5,291,799 | 3/1994 | Govani et al. | 73/170.17 |

*Primary Examiner*—Richard Chilcot
*Assistant Examiner*—R. Biegel
*Attorney, Agent, or Firm*—Banner & Allegretti Ltd.

[57] ABSTRACT

A rain gauge comprising a graduated open end rain collection tube having fins on its lower end. The tube is pivotally mounted at its mid point on a pin secured to one end of a swivel arm rudder, the other end of said swivel arm rudder being mounted for rotation on the end of a support rod stuck into the ground. Wind on the rudder and fins causes the tube to tilt and turn into the wind with the open end facing the rain.

14 Claims, 2 Drawing Sheets

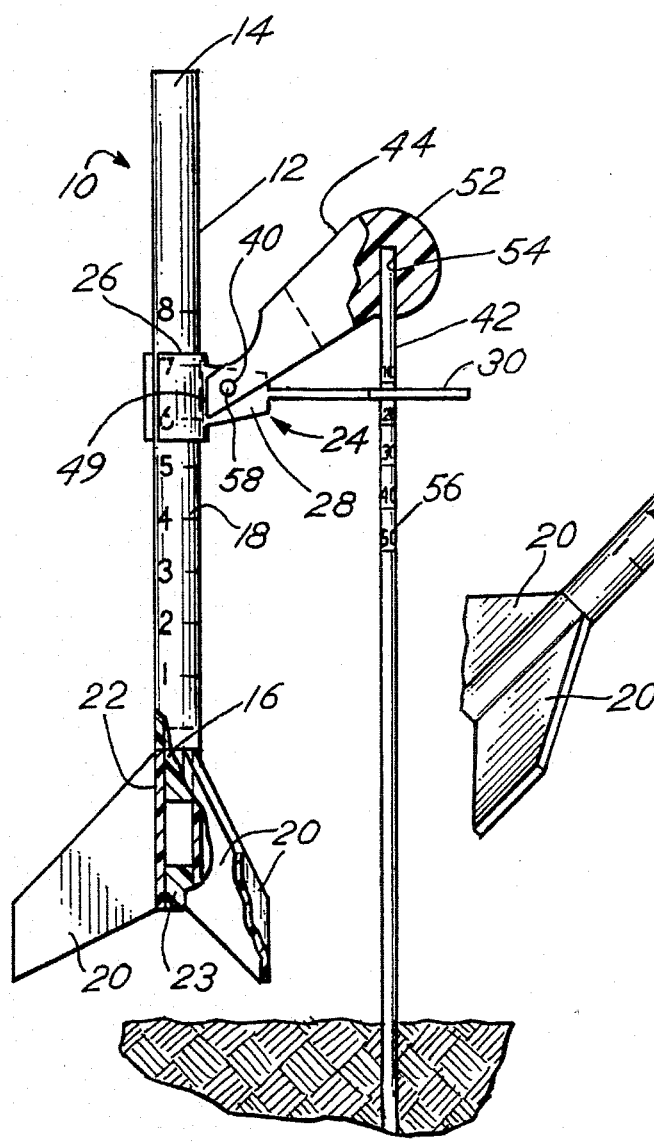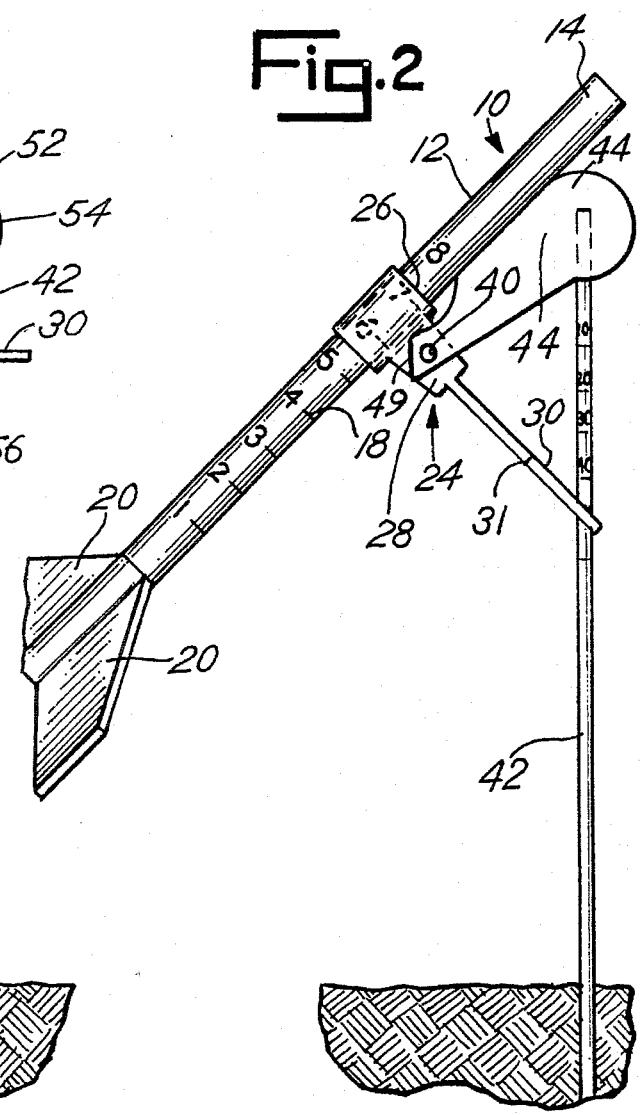

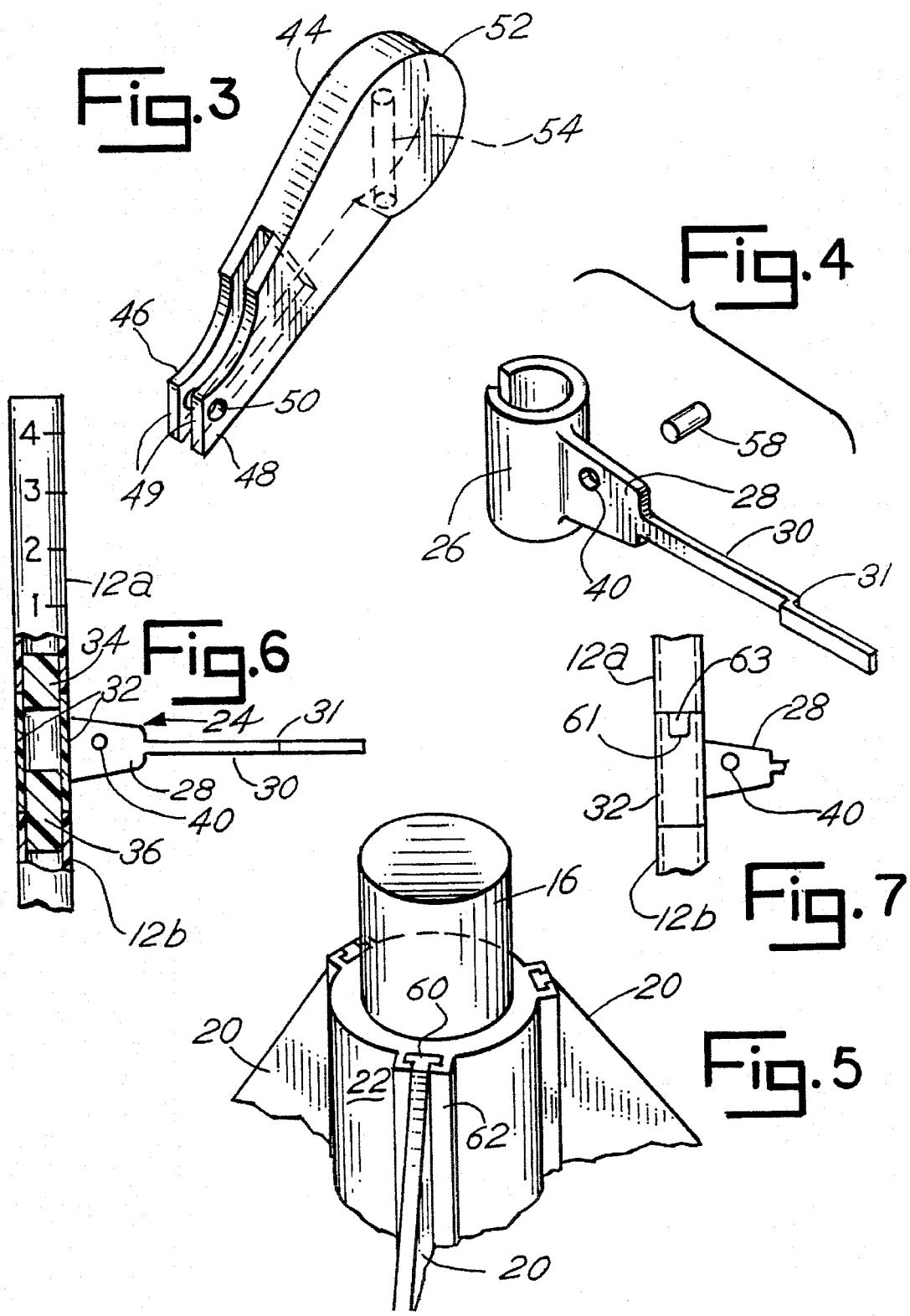

RAIN GAUGE

This invention relates to an improved rain gauge for measuring rain fall accurately irrespective of the velocity of the wind carrying the raindrops across the gauge, which gauge also measures the wind velocity.

PRIOR ART

Rain gauges which tilt in the wind to present the mouth of the container at right angles to the direction of rainfall have been disclosed in many different forms. (Thomson U.S. Pat. No. 916,060; Johnson U.S. Pat. No. 1,407,068; Moore U.S. Pat. Nos. 2,384,954 and 2,520,557; and Quinteros U.S. Pat. No. 2,570,710.) These prior structures are complicated in construction, cannot be manufactured economically and the readings tend to be inaccurate. For example, the structures of Moore have so many surface areas in the collecting parts upstream of the actual measuring container that water will remain in these areas and not flow to the final collection container where the volume is measured. In some instances, parts are interposed between the rain and the collecting opening which adversely affects the reading. None of these prior art gauges simultaneously measure wind velocity. In recording weather information, it is desirable to ascertain the wind velocity as well as the amount of rainfall.

SUMMARY OF THE INVENTION

The object of the present invention is to provide a rain gauge construction of the type described which obviates the problems of the gauges previously disclosed, to provide a construction having few parts, primarily molded from plastic resins and which measures rainfall and wind velocity simultaneously.

The construction of the invention is characterized by a finned rain collecting tube which is mounted on one end of a swivel arm. The other end of the swivel arm contains a bearing bore which fits over the end of a mounting rod inserted in the ground. The swivel arm is preferably molded from smooth plastic material such as nylon or teflon which minimizes friction between the bearing and the upper portion of the rod on which the arm is mounted. By this means, the collecting tube will Freely rotate through 360°; the specific angle depending upon the direction of the wind.

The means for mounting the collecting tube on the swivel arm consists of a tube support Fixed to the tube, including an axle disposed at 90° to the axis of the tube. The inner end of the swivel arm next to the collecting tube is mounted on the axle. By this means, the tube, which is fixed in the tube support, will tilt about the axle when the wind blows against the fins on the end of the tube. A flange extending From the tube support terminates in an elongated pointer. The pointer extends normal to the axis of the cylindrical collecting tube across the face of the support rod. Wind blowing against the collecting tube causes the tube to swivel about the mounting rod and simultaneously tilt on the axle so that the open mouth of the collecting tube faces the rain being driven by the wind. The rain collected in the tube is measured by indicia on the surface of the tube. As the collecting tube tilts in the wind, the pointer moves down the surface of the rod which carries indicia indicating the speed of the wind in miles per hour. The tube support is fixed securely to the collecting tube and consequently there is no relative movement between the tube and the pointer extending From the tube support.

The rain gauge construction, therefore, consists essentially of four parts: a collection tube, a tube support, a swivel arm, and a support rod, which can be manufactured at low cost and easily assembled.

BRIEF DESCRIPTION OF THE DRAWINGS

FIG. 1 is a front elevational view of the assembled rain gauge mounted on a rod which is driven into the ground.

FIG. 2 is a view like FIG. 1 with the collection tube tilted into the wind.

FIG. 3 is a perspective view of the plastic swivel arm which swivels on the end of the rod and carries a pin in the opposite end thereof about the axis of which the collecting tube tilts.

FIG. 4 is a perspective view of the tube support and the integrally formed pointer for indicating wind velocity.

FIG. 5 is a perspective view of the upper end of a fin construction in which the fins are removable from the fin tube.

FIG. 6 is front view, partially in section, of an alternative construction for the tube support and collection tube.

FIG. 7 is front view of alternative structure for securing the collection tube to the tube support.

DETAILED DESCRIPTION

The rain gauge of the invention is indicated generally at 10 and consists of a plastic tubular collection container 12 molded from a material such as polyvinylchloride resin. The tube has indicia molded in the surface thereof which indicate the amount of rain collected in the tube. The upper end of the tube 14 is open and the lower end is closed by a plug 16 which forms the bottom of the container. A fin tube 22 having three fins 20 spaced apart at 120° connects to the lower end of the plug 16 by reason of frictional engagement with the fin tube 22. The lower end of the fin tube may carry a calibrating weight 23 for adjusting the force required to tilt the collection tube.

A band-like tube support 24 molded from resilient plastic material comprises a split cylinder 26, an integrally formed flange 28, and a pointer 30. The support is molded as a unit. The split cylinder 26 can be slid over the end of the tube 12 by spreading the springy free ends of the split cylinder. The cylinder firmly grips the tube 12. An opening 40 extending through the flange 28 receives a pin or axle 58 which passes through concentric openings 50 in the bifurcated arms 46, 48 of the swivel arm 44 (FIG. 3). The arms 46, 48 on the inner end of the swivel arm 44 i.e. the end adjacent tube 12 are narrower than the other portions of the arm to accommodate the flange 28 of cylinder 26 when the tube tilts about the pivot pin 58. The collection tube is permitted to tilt in the direction of the swivel arm 44 at a maximum angle of approximately 45° before contacting the flat upper surface of the arm. The tube in tilted position is shown in FIG. 2.

The swivel arm 44 has flat sides like a rudder and is molded from a resin such as nylon or teflon which offers little frictional resistance to the rotation of arm 44 about the upper end of support rod 42. A blind bore 54 is molded in the outer end of the arm 44 and serves as a bearing about which the arm can swivel. Preferably, the rod 42 is made from rustproof metal such as chromium plated or zinc plated steel. The surface of the rod is smooth and the bearing 54, being made from a low-friction resin, rotates freely about the rod 42. The rod 42 carries indicia 56 indicating the speed of the wind in miles per hour as indicated by the position of the pointer 30 which moves downwardly as the tube 12 tilts about pin 58 in response to the force of the wind. The pointer 30 is offset at 31 to accommodate the width of rod 42.

The fins on the end of the tube 12 act similarly to the fins on an arrow, and together with the rudder-like swivel arm, serve to point the tube 12 into the wind. Rain falls into the open end 14 of the collection tube 12. The quantity can be measured by the markings on the surface of the tube 12 as the water fills the tube.

The fins 20, instead of being molded integrally with the fin tube 22, can be detachably mounted on the fin tube by means of the construction shown in FIG. 5. The external surface of the tube 22 has external elongated slots 62 molded onto the surface thereof. The inner ends of the fins 20 terminate in a T-shaped flange 60 which slides into the complementary slot 62. This facilitates removing the fins from the tube 22 for purposes of packing and shipping the rain gauge.

FIG. 6 shows an alternative construction for the tube support 24 in place of the split cylinder 26 gripping the tube 12. The tube support has a cylindrical portion 32 of the same diameter as the collection tube 12. In this construction, the collection tube is broken into two parts, 12a and 12b and the cylindrical portion 32 of the tube support 24 is connected to the ends of the segments 12a and 12b by means of plugs 34, 36. In this case, the plug or barrier 34 serves as the bottom of the collection tube container and the indicia are marked above this level as the zero point. The flange 28 and pointer 30 of the tube support 24 are formed the same as those elements in the construction of FIG. 1.

Means for locking the collection tube against rotation with respect to the tube support 24 is shown in FIG. 7. Tube portion 12a has a tongue 63 projecting from the lower end thereof which fits into a complementary slot 61 in the cylinder 32.

The inner ends 49 of the bifurcated arms 46, 48 of the swivel arm 44 extend vertically downward below the axis of the pin 58 extending through openings 40, 50. These vertical surfaces 49 bear against the opposing surfaces of tube support 24 and prevent the collection tube 12 from tilting in a direction away from the swivel arm 44 and the support rod 42. In other words, when there is no wind and the collection tube 12 is at rest, it assumes a vertical position with surface 49 in contact with the cylinder 26, as shown in FIG. 1. When the wind is blowing, the tube 12 tilts only in the direction of the swivel arm and the support rod 42. The maximum angle of tilt is about 45°. Thus, accumulated water in the tube is prevented from spilling out.

I claim:

1. A rain gauge comprising
a graduated plastic collection tube having an open end to receive rainfall and a closed end opposite said open end,
a plurality of spaced fins mounted on the tube adjacent said closed end,
a tube support fixed to said tube between said open end and said fins and extending radially from said tube,
a pin mounted in said tube support at a right angle to the axis of said tube about which said tube tilts,
a swivel arm having an inner and an outer end, supporting said pin at said inner end, said arm having a low friction bearing bore in said outer end, and
a support rod for insertion in the ground having an upper end disposed within said bearing bore, said upper end having a smooth surface to permit free rotation of said tube about said rod.

2. The rain gauge of claim 1 in which said tube support terminates at its outer end in a pointer extending across said rod, and said rod carries graduated markings indicating wind velocity, whereby tilting of said plastic tube by the wind causes said pointer to coincide with markings commensurate with the wind velocity.

3. The rain gauge of claim 1 in which said swivel arm has flat side walls, the inner end thereof being bifurcated and disposed on either side of said tube support.

4. The rain gauge of claim 3 in which said bifurcated arms terminate in flat surfaces which bear against said tube support below the axis of said pin to prevent said collection tube from tilting in a direction away from said support rod.

5. The rain gauge of claim 2 in which said fins are mounted on a fin tube approximately equal in diameter to said graduated plastic tube, said fin tube being connected to said graduated plastic collection tube by means of a plug which also serves as the closure for said closed end of the graduated plastic collection tube.

6. The rain gauge of claim 5 in which fins are detachably secured to said fin tube.

7. The rain gauge of claim 1 in which said swivel arm is molded from nylon or teflon.

8. The rain gauge of claim 5 in which includes a calibration weight in the end of said fin tube.

9. The rain gauge of claim 2 in which said collection tube consists of two separate axially aligned tubes, said tube support has a cylindrical part concentric with said separate tubes, and is connected to said separate tubes by plugs within said tubes.

10. The rain gauge of claim 9 in which one of said separate tubes has a tongue projecting from one end thereof and said tube support has a complementary slot into which said tongue fits.

11. The rain gauge of claim 2 in which said tube support is secured to said collection tube by a resilient plastic cylinder which embraces said collection tube, and includes a flange from which said pointer extends, said cylinder, flange and pointer being integrally molded from plastic as a unit.

12. A rain gauge comprising
a graduated collection tube having an open upper end to receive rainfall and a lower end opposite said open end,
a barrier in said collection tube between said upper and lower ends to form a bottom to support rain water in said tube,
a plurality of fins mounted on and spaced around said lower end,
a band-like tube support, fixed to said tube between said open end and said fins, and extending radially therefrom,
a pin mounted in said tube support at a right angle to the axis of said tube about which said tube tilts,
a swivel arm rudder having an inner end which supports said pin and an outer end having a blind bore therein, and
a support rod, having one end disposed within said blind bore, about which said swivel arm rudder pivots.

13. The rain gauge of claim 12 in which said radial extension of said tube support consists of a flange, said inner end of said swivel arm rudder is bifurcated and said pin extends through said flange with its ends mounted in the bifurcated portion of said inner end.

14. The rain gauge of claim 3 in which said swivel arm has an upper flat surface which constitutes a stop to arrest the tilting of said collection tube to a maximum angle of about 45°.

* * * * *